United States Patent [19]

Parent

[11] 4,054,873
[45] Oct. 18, 1977

[54] DEVICE FOR FORMING CHANNELS

[75] Inventor: Guy Parent, Le Plessis Robinson, France

[73] Assignee: Compagnie Industrielle des Telecommunications Cit-Alcatel S.A., Paris, France

[21] Appl. No.: 697,666

[22] Filed: June 18, 1976

[30] Foreign Application Priority Data

June 26, 1975 France .............................. 75.20103

[51] Int. Cl.² .............................................. G01S 3/00
[52] U.S. Cl. .............................. 343/113 R; 340/6 R; 340/16 R; 343/118
[58] Field of Search .......................... 343/113 R, 118; 340/6 R, 16 R

[56] References Cited

U.S. PATENT DOCUMENTS

3,792,479  2/1974  Faugeras et al. ................. 343/113 R
3,947,805  3/1976  Faugeras et al. .................... 340/6 R Primary Examiner—Maynard R. Wilbur
Assistant Examiner—Richard E. Berger
Attorney, Agent, or Firm—Sughrue, Rothwell, Mion, Zinn and Macpeak

[57] ABSTRACT

Device for forming channels using detectors regularly spaced out on a circular base comprising a chain constituted by an alternate sequence of identical adders and identical delay devices. The outputs of the detectors are sampled and applied through shift registers enabling them to be delayed more or less on the lateral inputs of the adders. The device comprises less elements than known channel forming devices. Application to sonars.

12 Claims, 6 Drawing Figures

DEVICE FOR FORMING CHANNELS

BACKGROUND OF THE INVENTION

The present invention relates to a device for forming channels comprising H detectors spaced out regularly on a circular base, H peak limiters, each peak limiter being connected to the output of a detector, a chain constituted by an alternating sequence of adders and of delay devices, each delay device comprising several elementary delay cells of delay $\tau$ ($\tau = 1/F_H$) and being connected at their output to an input of an adder of the chain.

This device makes it possible to determine the direction of propagation of a plane wave by detection of this wave in several predetermined directions regularly spaced out in a plane.

Such a device, applicable in sonars or in radars, is described in U.S. Pat. Nos. 3,792,479 and 3,691,514.

When the device is applied in sonars, the detectors are hydrophones and the wave whose direction is detected is an acoustic wave.

The known device comprises multiplexing means constituted by N multiplexers having H inputs enabling the applying of the signals sent out by the coders to the input of the chain and to lateral inputs of the adders.

Moreover, in the known system, the delays of the devices vary according to a cosine law, so that it is necessary to provide N − 1 different delay devices, this leading, when the assembly is installed on cards, to a great number of different cards.

Lastly, the precision of the known system depends on the number N, N being the number of multiplexers, for the number of signals from detectors used for forming each channel is N, so that the higher the precision is, the more elements there are in the chain.

SUMMARY OF THE INVENTION

The system according to the invention makes it possible to simplify the switching means which entail a great quantity of equipment.

Moreover, it enables a simplification of the chain which can comprise fewer elements and which elements (delay devices) can be standardized while still maintaining sufficient precision.

The channel forming system according to the invention comprises H detectors regularly spaced out on a circular base, H peak limiters, each peak limiter being connected to the output of a detector, a chain constituted by an alternate sequence of adders and of delay devices, each delay device comprising several elementary delay cells $\tau$ ($\tau = 1/F_H$) and being connected at their output to an input of an adder of the chain, is characterized in that it further comprises:

a shift register forming a looped circuit and comprising H stages, the parallel inputs of the said stages being connected to the outputs of the H peak limiters and the parallel outputs of the said stages being connected to inputs of the said adders of the chain, and a clock supplying a frequency $F_V = F_H/H$ by means of which the output signals are sampled by the said register and a frequency $F_H$ by means of which the data advances along the stages of the said register and along the delay devices.

By means of the shift register which is used for sampling, the use of N multiplexers having H inputs can be avoided; moreover, in the delay device according to the invention, the delay function which was fulfilled previously in the known device exclusively by the delay devices is also fulfilled by the input shift register so that the delay devices are less numerous than those in the known chain. According to a preferred embodiment of the invention, the delay devices all have an identical delay T, this leading to a precision of ± T/2 on the measurements.

According to a first variant of the invention making it possible to improve the precision in the measurements without changing the number of delay devices constituting the chain, the device for forming channels comprises H detectors regularly spaced out on a circular base, H peak limiters, each peak limiter being connected to the output of a detector, a chain constituted by an alternate sequence of adders having several inputs and of delay devices, each delay device comprising several elementary delay cells $\tau$ ($\tau = 1/F_H$) and being connected at their output to an input of an adder of the chain, and is characterized in that it comprises, moreover, means for sampling at a frequency $F_V$ the signals coming from the H peak limiters where $F_V = (F_H k)/H$, $k$ being a sub-multiple of H, a square matrix of $k \times k$ shift registers, each of these registers comprising H/k stages, the $k$ registers of each line of the matrix being connected up in series and the series output of the first being connected to the series input of the last register to form a closed loop, the H/k parallel outputs of each register of a column of the matrix being connected to the H/k parallel inputs of the following register of the said column, certain parallel outputs of the $k \times k$ registers of the matrix being applied to the inputs of the adders of the chain, transfer means for the transfer of data coming from the sampling means towards the first line of the square matrix which shift by H/k (modulo H) the number of the peak limiters transferred every $1/F_V$, a clock supplying a frequency $F_H$ used for controlling the shifting of the data in the lines of the matrix and in the delay devices and a frequency $F_V$ used for controlling the sampling means and the transfer means as well as the advance of the data along the columns.

The "delay" function is then fulfilled by the delay devices and by the matrix of $k \times k$ registers.

According to a preferred embodiment of this first variant, the delay devices of the chain all have an identical delay which is equal to or a multiple of $H_\tau$.

According to a particular embodiment of this first variant, the sampling means are constituted by $k$ input shift registers each comprising H/k stages, each of the H peak limiters being connected to the parallel input of a stage of one of the input registers and the transfer means comprising $k$ multiplexers having $k$ inputs and one output, the $k$ inputs of the multiplexers being connected to the series outputs of the $k$ input registers as well as $k$ transfer shift registers each comprising H/k stages, the input of each transfer register being connected to the output of a multiplexer and the parallel outputs of a transfer register being connected to the parallel inputs of a register of the first line of the matrix.

Transfer means for the data coming from the sampling means towards the main registers which shift the numbers of the transferred peak limiters every $1/F_V$ by H/K (modulo H).

According to a second variant making it possible to reduce the number of shift registers (for an equal number of stages) used for delaying the various signals in relation to the first variant, the device for forming channels comprises H detectors regularly spaced out on a circular base, H peak limiters, each peak limiter being numbered from 1 to H and being connected to the output of a detector, a chain constituted by an alternate sequence of adders and of delay devices, each delay device comprising several elementary delay cells $\tau$ ($\tau = 1/F_H$) and being connected at their output to an input of an adder of the chain, characterized in that it comprises, moreover, means for sampling, at a frequency $F_V = F_H/H.k$ ($k$ being a sub-multiple of H greater than unity), signals coming from the H peak limiters, $h$ main shift registers ($h < k$) forming an open looped circuit, each of these registers comprising H/$k$ stages, $i$ charging shift registers whose input is connected to the output of $i$ registers taken from among the $h$ main registers ($i < h$); each of the said charging registers comprises H. $(k - 1)/k$ stages, a clock supplying a frequency $F_H$ used for controlling the shifting of the data along the open loop constituted by the $h$ main registers and along the charging registers, as well as in the delay devices and a frequency $F_V$ used for controlling the sampling means and the transfer means, some parallel outputs of the $i$ charging registers and of the main registers to which these charging registers are connected being connected to the inputs of the adders of the chain and in that the delay devices comprise the same number of qH of elementary cells, where $q \geq 1$.

According to a particular embodiment of this second variant, the sampling means are constituted by $k$ input shift registers each comprising H/$k$ stages, each of the H peak limiters being connected to the parallel input of a stage of one of the input registers and in that the multiplexing transfer means being connected to the series outputs of the $k$ input registers and $h$ transfer shift registers each comprising H/$k$ stages, the input of each transfer register being connected to the output of a multiplexer and the parallel outputs of a transfer register being connected to the parallel inputs of one of the main registers.

BRIEF DESCRIPTION OF THE DRAWINGS

Embodiments of the invention will be better understood from the following description which is by way of example and refers to the accompanying drawings in which all the figures are block diagrams and in which.

DESCRIPTION OF THE PREFERRED EMBODIMENTS

Figure 1:
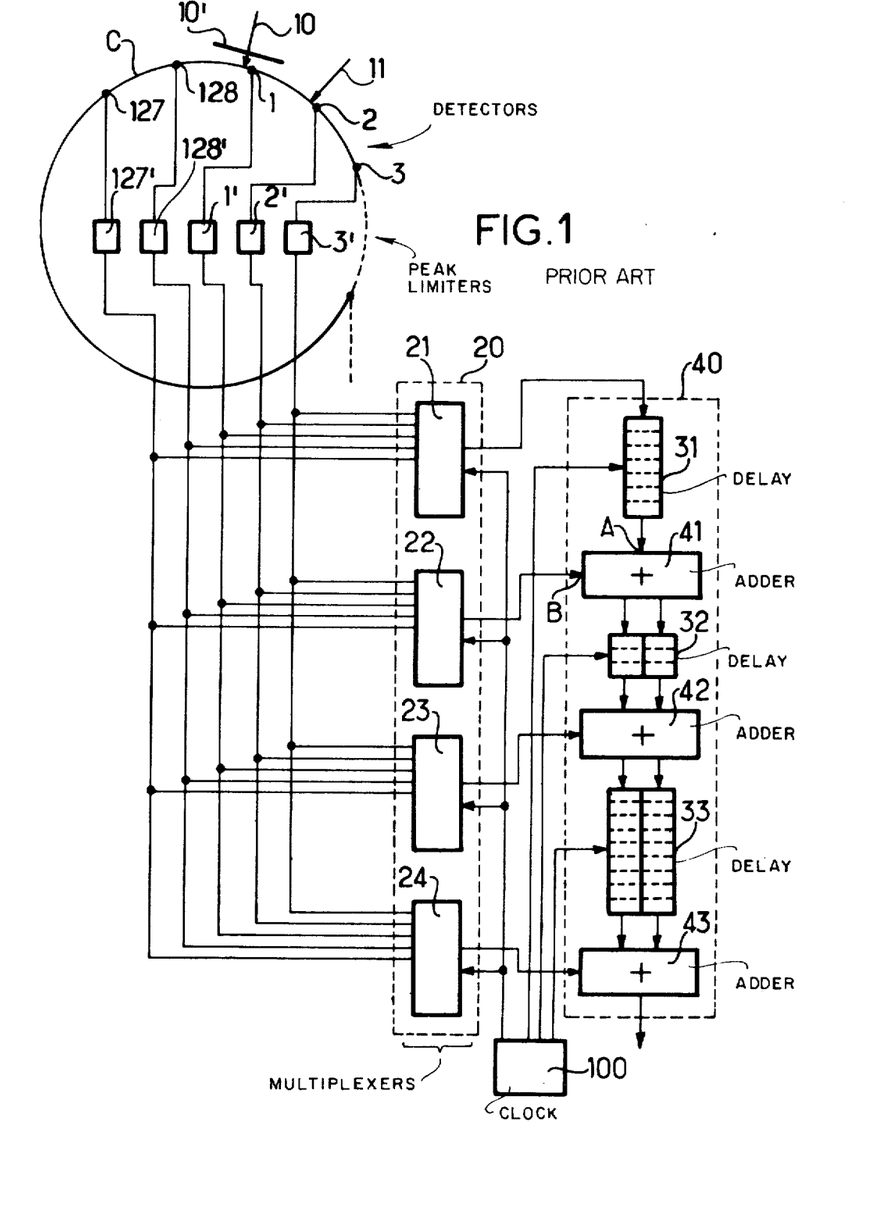
FIG. 1 shows a known type of device for forming channels.

By way of example FIG. 1 shows a known type of device for forming channels.

This device comprises H detectors numbered 1 to H, spaced out regularly round a circular base C. Each detector such as 1 is connected to a coder such as 1' which encodes the signal supplied by the corresponding detector 1 using a pure binary code. (The coders 1' 2' . . . can advantageously be constituted by peak limiters). The outputs of all the coders are connected to a switching device 20 constituted by N multiplexers 21, 22, 23, 24 each having H inputs.

The device also comprises a chain 40 including an alternating sequence of (N − 1) delay devices 31, 32, 33 and of (N − 1) adders 41, 42, 43.

Each adder has an input A connected to the output of the preceding delay device and a lateral input B. The adder sums the signals received on its inputs A and B, (the signal received by the input A may comprise several bits in parallel).

Each delay device comprises a plurality of elementary delay cells.

Each cell can delay a signal comprising $n$ parallel bits by a delay period $\tau$.

The output of the multiplexer 21 is connected to the input of the chain 40 and thus of the delay device 31 and the outputs of the multiplexers 22, 23, 24 are connected to the lateral B inputs of the adders 41, 42, 43.

A direction of propagation 10 of a plane wave 10' of frequency $F_S$ is arranged to correspond to each group of N consecutive detectors.

Let it be assumed that the wave 10' propagating in the direction 10 reaches in the first instance the detector 1 then the detector 128 then the detector 2 and lastly the detector 127. The delay of the device 31 will be fixed at $n_1\tau$ where $n_1\tau$ is the time taken by the wave 10' to travel between the detector 1 and the detector 128.

The delay device 31 therefore comprises $n_1$ elementary delay cells.

The delay device 32 comprises $n_2$ elementary delay cells, $n_2$ being equal to the propagation time of the wave in the direction 10 between the detector 128 and the detector 2.

More generally, the $p^{th}$ delay device comprises $n_p$ elementary delay cells, $n_p\tau$ being equal to the propagation time of the wave in the direction 10 between the $p^{th}$ detector reached and the $(p+1)^{th}$ detector reached.

To verify whether the propagation occurs in the direction 10 i. e. corresponds to the channel 10, the output of the coder 1' must be applied through the multiplexer 21 to the input of the delay device 31 at a starting instant, then $n_1\tau$ later, the output of the coder 128' must be applied through the multiplexer 22 to the B input of the adder 41, then $n_2\tau$ later, the output of the coder 2' must be applied through the multiplexer 23 to the B input of the adder 42, and finally $n_3\tau$ later, the output of the coder 127' must be applied through the multiplexer 24 to the B input of the adder 43.

A signal $S_{10}$ is obtained at the output of the chain 40, i. e. at the output of the last adder 43 which signal will comprise the sum of four bits if the wave 10' was indeed propagating along the direction 10.

To verify whether the propagation of the signal occurs along the direction 11, (which is shifted clockwise from the direction 10 by an angle at the center of the circle equal to the arc separating two consecutive detectors) it is only necessary to apply the signals coming from the coders related to the detectors 2, 1, 3, 128 instead of the signals related to the detectors 1, 128, 2, 127 as described above for the direction 10.

The detectors being reached by the wave propagating in the direction 11 in the following order: 2, 1, 3, 128, the signal coming from the detector 2 must be applied to the delay device 31 at a starting instant, then $n_1$ later, the signal coming from the detector 1 must be applied to the adder 41, then $n_2$ later, the signal coming from the detector 3 must be applied to the adder 42, and finally $n_3$ later, the signal coming from the detector 128 must be applied to the adder 43.

By suitable switching of the inputs to the chain 40, different sum signals $S_{10} S_{11}$ etc ... can be obtained at the output of the adder 43. H different directions evenly spaced out in the plane can thus be monitored, each direction being related to a group of N detectors.

A clock 100 sends out pulses at a frequency $F_H [F_H = 1/\tau)]$ which are applied to the delay cells of the delay devices 31 to 33 to make the signals progress along the chain. Clock pulses at the frequency $F_H$ are also applied to the multiplexers 21 to 24 and are used for controlling the sampling of the signals. The delay devices 32 and 33 are constituted by two shift registers disposed in parallel, each register being used for shifting one bit of the signal obtained at the output of the adders 41 and 42.

In the case where $N = 4$, the first delay device 31 comprises a single shift register, the second delay device 32 comprises two shift registers in parallel, in order to be able to shift the sum of two bits where applicable and the third delay device 33 also comprises two shift registers in parallel in order to be able to shift the sum of three bits. For larger N the next four delay devices would need three shift registers in parallel, the following eight delay devices would need four in parallel, etc.

All sets of the shift registers connected in parallel evidently have the same number of stages and the several stages situated at each level constitute one elementary delay cell.

Every $1/F_H$ seconds, the input of the chain and the lateral input of each of the (N − 1) adders are supplied with the signals coming from N coders each bearing a determined number and in the following period $1/F_H$, the input of the chain and the lateral input of each adder, each receive the signal coming from a coder whose number is incremented by 1 in relation to the number of the coder which supplied the signal during the preceding period $1/F_H$.

To form H channels, the H detectors reached in the first instants in each of the H channels are applied sequentially to the input of the chain; the H detectors reached in the second instants in each of the H channels are applied sequentially to the lateral input of the first adder; the H detectors reached in the $(q + 1)^{th}$ instants in each of the channels are applied sequentially to the lateral input of the $q^{th}$ adder; the H detectors reached in the $N^{th}$ instants for each of the channels are applied sequentially to the lateral input of the $(N − 1)^{th}$ adder.

In the known device the signals S of all the groups of detectors, and therefore of all the channels, are all shifted by a same angle in relation to the adjacent channels and are obtained sequentially at the output of the chain at the frequency $F_H$. The maximum signal $S_H$ corresponding to a determined channel provides the direction of arrival of the plane wave with an approximation which is in the order of the angle separating two consecutive channels.

The signal $S_H$ is renewed at a frequency $F_e$ equal to $F_H$ divided by the number of channels formed.

$F_e = F_H \times 1/H$, this frequency being greater than twice the frequency $F_s$ of the wave.

Figure 2:
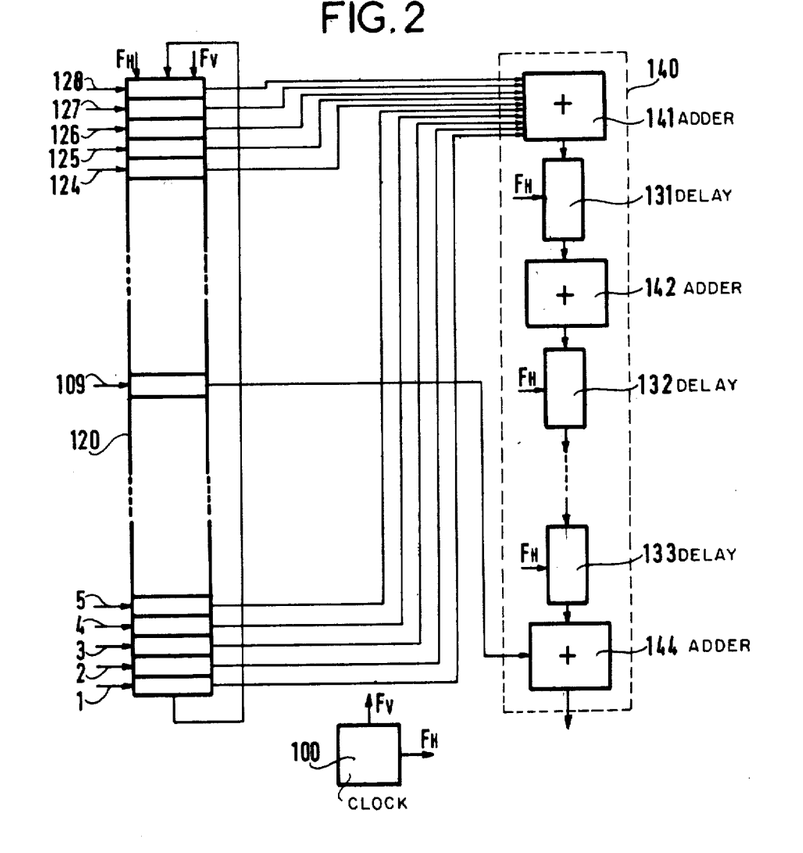
FIG. 2 shows in general terms of a device for forming channels according to the invention.

Since the present invention uses the same arrangement of detectors etc, as shown in FIG. 1, FIG. 2 does not repeat the circular base comprising the H detectors numbered from 1 to H followed by the H peak limiters also numbered from 1 to H.

FIG. 2 shows a device for forming channels according to the present invention. By way of an example, it is assumed that H = 128.

The device comprises a chain 140 constituted by an alternating sequence of P delay devices 131, 132, 133 and by P + 1 adders 141, 142, 143, 144 (the chain begins and ends with an adder).

The delay devices all comprise the same number of elementary delay cells. Each elementary delay cell has a delay $\tau$, and the delay devices are capable of delaying digital signals comprising several bits in parallel.

Each adder sums the digital signal coming from the delay device applied to its A input wit binary signals applied to its lateral B input or inputs.

A shift register 120 has H stages whose parallel inputs are connected to the outputs of the H peak limiters, one peak limiter per stage. The register 120 is connected in a loop.

The first adder of the chain 140 has its inputs connected to $\mu$ consecutive parallel outputs of the register 120; likewise, the inputs of the outer adders are connected to parallel outputs of the register 120. Assuming that each channel is defined by N detectors, the total member of connections between outputs of the register 120 and inputs to the adders in the chain is equal to N.

To determine which stages will be connected to each adder, we refer to the following table in which it has been assumed that $H = 128$ and $N = 40$.

40 samples must be taken for each channel. The samples have been shown in order in the first column of the table. The second column shows the reference numbers of the detectors in their sampling order to form channel number 1. The third column shows the delays in microseconds which separate the instants when a wave which has arrived in the direction corresponding to channel 1 reaches the detectors shown in column 2. These delays increase and follow a cosine law.

Figure 4:
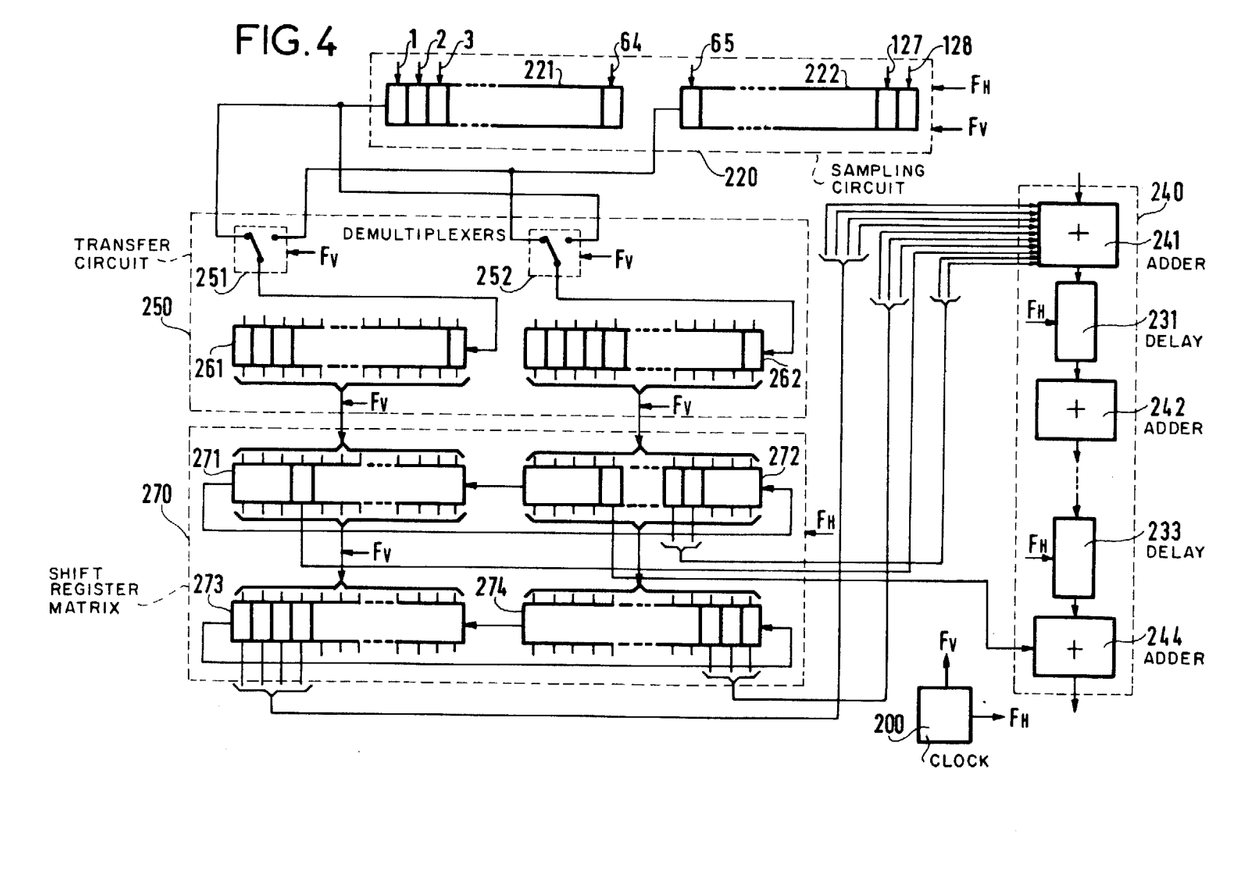
FIG. 4 shows a first embodiment of a first variant of the device for forming channels according to the invention.
Figure 5:
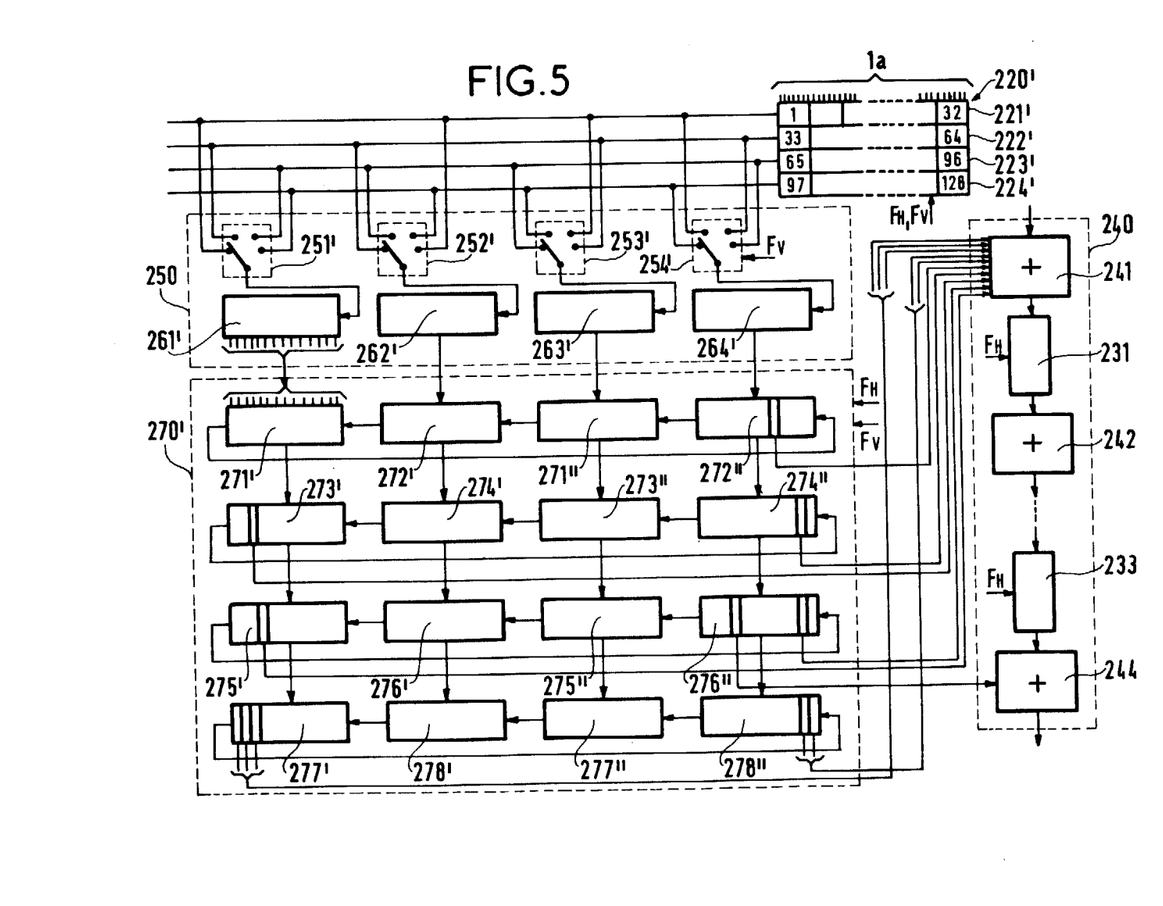
FIG. 5 shows a second embodiment of this first variant.

| Sampling order | Detector reference numbers for channels | Delays | Adders in figure 2 | Adders in figure 4 | Adders in figure 5 |
|---|---|---|---|---|---|
| 1 | 1 | 0 |  | × | × |
| 2 | 128 | 0.6 |  | × | × |
| 3 | 2 | 1.8 |  | × | × |
| 4 | 127 | 3.6 |  | × | × |
| 5 | 3 | 6 | 1 | × | × |
| 6 | 126 | 9 |  | × | + |
| 7 | 4 | 12.6 |  | × | + |
| 8 | 125 | 16.8 |  | − | − |
| 9 | 5 | 21.6 |  | − | − |
| 10 | 124 | 26.9 |  | − | . |
| 11 | 6 | 32.9 |  | × | × |
| 12 | 123 | 39.49 |  | × | × |
| 13 | 7 | 46.6 | 2 | × | + |
| 14 | 122 | 54.3 |  | − | − |
| 15 | 8 | 62.58 |  | − | . |
| 16 | 121 | 71.4 |  | × | × |
| 17 | 9 | 80.8 | 3 | − | − |
| 18 | 120 | 90.75 |  | − | − |
| 19 | 10 | 101.25 |  | × | × |
| 20 | 119 | 112.28 | 4 | − | − |
| 21 | 11 | 123.85 |  | − | . |
| 22 | 118 | 135.9 |  | × | × |
| 23 | 12 | 148.56 | 5 | − | − |
| 24 | 117 | 161.7 |  | × | × |
| 25 | 13 | 175.3 | 6 | × | + |
| 26 | 116 | 189.4 |  | − | . |
| 27 | 14 | 204 |  | × | + |
| 28 | 115 | 219.1 | 7 | − | . |
| 29 | 15 | 234.7 |  | × | + |
| 30 | 114 | 250.8 | 8 | − | . |

-continued

| Sampling order | Detector reference numbers for channels | Delays | Adders in figure 2 | Adders in figure 4 | Adders in figure 5 |
|---|---|---|---|---|---|
| 31 | 16 | 267.2 |  | × | + |
| 32 | 113 | 284.2 | 9 | — | . |
| 33 | 17 | 301.5 |  | × | + |
| 34 | 112 | 319.3 | 10 | — | . |
| 35 | 18 | 337.5 | 11 | — | — |
| 36 | 111 | 356 |  | × | + |
| 37 | 19 | 371 | 12 | — | — |
| 38 | 110 | 394.4 |  | × | + |
| 39 | 20 | 414.1 | 13 | — | . |
| 40 | 109 | 434.2 | 14 | — | — |

Preferably the delay devices are chosen to have an identical delay, each comprising H elementary delay cells with a delay of $1/F_H$. Then, by suitable arrangement, all the signals which will add to form channel 1 are applied to the adders at a single instant.

Taking $F_H$ equal to 4MHz, the delay of each device is $T = H/F_H = (128/4.10^6 = 32$ μsec. Therefore, to be able to sample 40 detectors for each channel (this corresponding to a delay of 434.2 μsec) 13 delay devices must be taken (this corresponding to 13 × 32 = 416 μsec, i. e. 448 μsecs to within 32 μsecs) and 14 adders. By splitting up the list of delays into batches of 32 μsec, it is deduced which detectors must be applied to which adders to form channel 1 (see column 4 of the table). Thus, for example, stages Nos. 9, 120 and 121 of the input register are applied to the adder 3.

In a case where the delay devices do not have a number of elementary cells equal to H or a multiple of H, but equal to J, for example, it would only be necessary to add $(a = 1)J$ to the number of the detectors in column 2 to have the number of the detectors to be applied to an adder $a$, these numbers being calculated modulo H; for example, for adder No. 3 and $J = 90$, the detectors 65, 63 and 64 will be applied instead of the detectors 121, 9 and 120 which will not be applied. Thus, the three inputs of the adder No. 3 would be connected to the outputs of the stages 63, 64, 65.

In the case where the delay devices have different delays, it would be necessary only to cut up the delay column taking into consideration the various delays to determine which detectors must be applied to the various adders; the numbers in column 1 will be increased by the number of the channel applied to the $n^{th}$ adder when the channel 1 is present at the first adder.

The device has clock 100 supplying clock pulses at the frequency $F_H$ and at the frequency $F_V = F_H/H$.

It is assumed, for example, that $F_H = 4$ MHz and that $H = 128$ and that $F_V - 32$ kHz.

Clock pulses of frequency $F_H$ are applied to the delay devices and to the input register, so as to make the data progress by one cell or one stage every $1/F_H$ secs.

The parallel inputs of the input register are controlled at the frequency $F_V$ so as to sample all the outputs of the peak limiters at the frequency $F_V$.

Thus, signals representative of each of the H channels are obtained sequentially at the output of the chain, once every $1/F_V$ secs. It will subsequently be necessary only to determine the maximum signal $S_H$ to obtain at the frequency $F_e = F_V$, the said signal $S_H$ which indicates the direction (to within $2\pi/H$) from which originates the signal picked up by the detectors.

Figure 3:
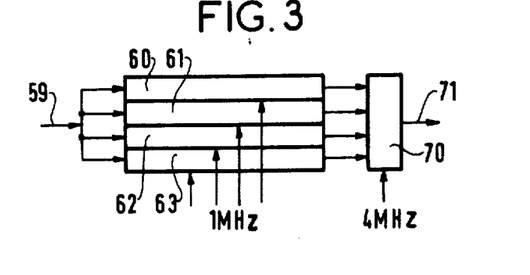
FIG. 3 shows an example of a delay device used in the device of FIG. 2.

FIG. 3 shows an embodiment of a delay device used in the chain. Since the delay devices are identical, each elementary cell must be able to delay 6 bits in parallel; now, with present technology it is very difficult to obtain commerical delay devices constituted by elementary cells delaying 6 bits in parallel and operating at a frequency of more than 2 MHz. (i.e. having a delay $\tau$ of less than 0.5 μsec). That is why, to constitute each delay device, several TMS 3112 delay circuits manufactured by National Semiconductor in parallel having at their output a demultiplexer will preferably be used.

In the case where $F_H = 4$MHz and $H = 128$, with 128 stages for each delay device, 4 delay circuits 60, 61, 62, 63 having 32 elementary cells each and fed by the same wire 59 will be provided. The four series circuits of the delay circuits are applied to the four inputs of a demultiplexer 70 having one output 71. The four delay circuits are controlled by series of pulses at a frequency of 1 MHz shifted in relation to one another by a quarter of a period and the demultiplexer is controlled at a frequency of 4 MHz.

Thus, the delay device provided is effectively the technical equivalent of a delay device having 128 cells in series controlled at a frequency of 4 MHz.

FIG. 4, which illustrates a variant of the device for forming channels according to the invention, does not show the circular base comprising the H detectors numbered 1 to H followed by the H peak limiters, also numbered 1' to H'. In the example concerned, it has been assumed that H = 128.

The device comprises a chain 240 constituted by an alternating sequence of P delay devices 231, . . . , 233-- and by P + 1 adders 242, . . . , 244-- (the chain begins and ends by an adder). The delay devices comprise the same number of elementary delay cells, each elementary delay cell having a delay $\tau$ and being capable of delaying a digital signal comprising several bits in parallel. Each adder makes it possible to sum a digital signal coming from the delay device applied to its A input with the binary signals applied to its lateral B input or inputs.

The device comprises sampling means 220 constituted by two input shift registers 221, 222 each comprising 64 stages, the parallel inputs of the 64 stages of the register 221 being connected to the peak limiters Nos. 1' to 64' and the parallel inputs of the 64 stages of the register 222 being connected to the peak limiters Nos. 65' to 128'.

The device comprises, moreover, transfer means 250 comprising a first and a second multiplexer 251 and 252 each having a first and a second input and an ouput. The first input of the multiplexer 251 is connected to the output of the input register 221 and the second input is connected to the output of the register 222. The first input of the multiplexer 252 is connected to the output of the input register 222 and the second input is connected to the output of the register 221.

The transfer means 250 also comprises a first and second buffer shift register 261, 262, each of which has 64 stages : the output of the first multiplexer 251 is connected to the series input of the first buffer register 261 and the output of the second multiplexer 252 is connected to the series input of the second buffer register 262. The device for forming channels also comprises a square matrix (2 lines by 2 columns) 270 of four shift registers 271, 272, 273, 274 each having 64 stages. The registers of the first line 271, 272 are connected in series and the output of the first register 271 is connected to the input of the second register 272 so as to form a loop. Likewise, the registers of the second line 273, 274 are connected so as to form a loop.

64 parallel outputs of the first buffer register 261 are connected to 64 parallel inputs of the first register 271 of the first line of the matrix and 64 parallel outputs of the second buffer register 262 are connected to 64 parallel inputs of the second register of the first line.

Within the first column of the matrix 270, 64 parallel outputs of the first register 271 of the first line are connected to 64 parallel inputs of the following register 273. Likewise, within the second column, 64 parallel outputs of the register 272 are connected to 64 parallel inputs of the following register 274.

The (P + 1) adders comprise N lateral inputs, where N >P+1. N corresponds to the number of detectors forming a channel.

The operation of the device will be better understood from a particular example.

An attempt is made to form sequentially $H = 128$ channels with a frequency $F_e = 31$ kHz, the circular base therefore comprises 128 detectors regularly spaced out.

For each channel to be formed, $N = 40$ detectors are used. The frequency $F_H = F_e \times H = 4$MHz. The delay between the first and the $N^{th}$ detector of a same channel is 430 μsec. By selecting delay devices each having a delay of $T = 32$ μsec, then $P = 14$.

It has been assumed that $k = 2$, i. e. it has been assumed that the increment of time is equal to $T/2$, i.e. 16 μsec ($\neq 8$ μ sec). It is supposed that the 40 detectors constituting the channel 1 are reached in the following order : 1, 128, 2, 127, ... 20, 109, as marked in table I.

The chain 240 comprises $P + 1 = 15$ adders. The table shows the delays which a wave arriving along channel 1 related to the 40 detectors 1 . . . 21, takes to reach these detectors. By classifying these delays in batches of 32 μsec and by dividing these into two sub-batches, the number of the outputs of the first and of the second lines of the matrix to be applied to the lateral inputs of the summing devices are deduced therefrom.

The clock 200 supplies pulses at the frequency $F_H$ and at the frequency $F_V = F_H/H . k$.

The sampling registers 221 and 222 are filled every $1/F_V$ secs and the stages of these registers are shifted at the frequency $F_H$. The multiplexers 251 and 252 are controlled at the frequency $F_V$.

Every $1/F_V$ secs, the buffer registers 261 and 262 are filled with the signals coming from the input registers 221 and 222. The advance in the stages of the buffer registers 261 and 262 is effected at the frequency $F_H$.

The registers 271 and 272 of the first line of the matrix 270 are filled every $1/F_V$ secs by the signals coming from the parallel outputs of the buffer registers 261 and 262. Likewise, the registers of the second line 273, 274 are filled every $1/F_V$ secs by the signals coming from the parallel outputs of the registers 271 and 272.

The circulation of the signals along the loop constituted by the shift registers of the first line and along the loop constituted by the registers of the second line is effected at the frequency $F_H$. The delay device 231 etc . . . comprise a plurality of $n$ stages, so that when the channel 1 is applied to the first adder, the channel $n+1$ (modulo H) is applied to the second adder of the chain. The delay of each delay device is then equal to $n/F_H$.

To determine what must be the connections between the parallel outputs of the registers of the lines of the matrix with the inputs of the adders of the chain, the sequence of delays is cut up into batches of $n/F_H$ and each batch is then cut up into $k$ sub-batches.

Thus, the $p$ samples with delays shorter than $n/F_H$ must be applied to the first adder. These $p$ first samples are separated into $k$ groups, the $k_1$ samples of the first group being applied with a delay of $n/F_H(K - 1/K)$ to the adder, i. e. they will be taken on the $i^{th}$ line of the matrix, the $k_2$ samples of the second group will be taken on the $(k - 1)^{th}$ line of the matrix and the samples of the $k^{th}$ group will be taken on the first line of the matrix.

These $p$ samples relate to the channel 1; therefore, these will be the detection samples 1, 128, 2, 127 . . . It will be necessary only to connect the inputs of the first adder to the appropriate $k_1$ stages of the $k^{th}$ line, the appropriate $k_2$ stages of the $(k - 1)^{th}$ line and so on. In the second delay batch there are $q$ samples which relate to the channel $n + 1$, i. e. the samples will be those of the $q$ detectors $n+1$, $(128 - n)$, $n+2$, $[(128 - (n+1)]$ . . . up into $k$ bataches of the stages in the $k^{th}$ line, namely, $n + 1$, $128 - n$ . . . The numbers of the stages of the other lines to be applied to the second adder will be obtained. All the numbers of stages are calculated modulo H.

It is an advantage to take $n$ as being equal to H or to a multiple of H, so that channel 1 is simultaneously applied to the $P+1$ adders, as is channel 2, $1/F_H$ later, and so on up to channel H.

Assuming that $n$ is equal to H, a delay is therefore provided for each delay device 231 etc, of $H/F_H$, i. e. 32 μsec (where $H = 128$ and $F_H = 4$MHz).

Referring to table 1, one finds sample order numbers, the corresponding delays and the numbers of the detectors which correspond for the channel 1; it is easy to deduce therefrom, by taking equal batches of 32 μsec and by forming, each time, $k = 2$ sub-batches, to which adders the stages of the lines of the matrix should be applied.

The batches are identical to those of column 4, but the numbers of the detectors whose signals must be delayed by 16 μsec and those which must not be delayed must be determined. In column 5, those which must be delayed by 16 μsec have been marked with a cross and those which must not be delayed have been marked with a dash. When a signal must be delayed by 16 μsec, it must be taken from the second line of the matrix; if it is not to be delayed, it is taken from the first line. Thus, at the 10 inputs of the first adder for the channel 1, the subsequently delayed signals coming from the detectors 1, 2, 3, 4 will be applied, i. e. from the first four stages of the first register 273 of the second line of the matrix, the delayed signals coming from the detectors 128, 127, 126, i. e. from the last 3 stages of the register 274 of the second line, the signal coming from the peak limiter 5, i. e. from the 5th stage of the first register 271 of the first line and the signals coming from the detectors 124 and 125, i. e. from the 4th and 5th stages starting from the last stage, of the second register 272 of the first line.

By way of an example, referring still to column 5 of the table, it will be seen that the second adder has five lateral inputs (three delayed and two non-delayed). The frequencies $F_H$ and $F_V$ are supplied by a clock 200. Therefore, the H signals representative of the channels (one signal every $1/F_H$ secs) will be obtained with the frequency $F_e = F_H/H$ (i. e. every $1/F_e$ sec) at the output of the chain 240. The precision obtained in the chain is $T/k$, i. e. 16 μsec.

FIG. 5 shows a device for forming channels similar to the one in FIG. 4, but assuming that $k = 4$; i. e. the square matrix comprises 4 × 4 registers each having $H/k$ stages, i. e. 32 stages. The chain 240 is identical to the one in FIG. 4, only the sampling means 220', transfer means 250' and the square matrix are modified.

The sampling means comprise four input registers 221', 222', 223', 224' each comprising 32 stages.

The parallel inputs of the 32 stages of the register 221' are connected to the peak limiters Nos. 1 to 32, those of the stages of the register 222' being connected to the peak limiters 33 to 64, those of the stages of the register 223' being connected to the peak limiters 65 to 96 and those of the stages of the register 224' being connected to the peak limiters 97 to 128.

The transfer means 250' comprise four multiplexers each having four inputs and one output 251', 252', 253', 254' and four buffer shift registers 261', 262', 263', 264', whose series input is connected to the output of a multiplexer. Thus, during a period $1/F_V$, the first input register is emptied into the first buffer memory 261', then, during the following period $1/F_V$, the second input register 222' is emptied into this first register; $1/F_V$ later, the register 223' is emptied and $1/F_V$ later, the register 224' is emptied, then, $1/F_V$ after, the register 221' again is emptied.

The data contained in the four input registers is therefore emptied into the four buffer registers by shifting by one register every $1/F_V$.

The square matrix 270' comprises 4 × 4 shift registers having 32 stages each, the first line comprises the registers 271', 272', 271", 272", the second line comprises the registers 273', 274', 273", 274", the third line comprises the registers 275', 276', 275", 276", and the fourth line comprises the registers 277', 278', 277", 278". The four registers of each line are connected in series to form a loop circuit with the output of the first register of each line being connected to the input of the last register.

Inside each column, the 32 parallel outputs of each register are connected to the 32 parallel inputs of the following register.

To determine the connections to be made, between the 40 inputs of the adders of the chain, reference must be made to the table I, cutting up each batch of 32 μsec into 4 sub-batches of 8 μsec. Thus, for channel 1, among the 10 inputs of the adder No. 1 (i. e. the one at the beginning of the chain 240), five inputs receive the signals from the detectors 1, 128, 2, 127, 3 which must be delayed by 24 μsec, two inputs receive the signals coming from the detectors 126 and 4 which must be delayed by 16 μsec, two inputs receiving the signals coming from the detectors 125 and 5 which must be delayed by 8 μsec and one input receiving the signal coming from the detector 124 which must not be delayed.

Column 6 of table I shows by a sign "x" opposite each detector number for channel 1, those signals which must be delayed by 24 μsec and which will therefore be taken on the fourth line of the matrix; by a sign "4", those signals which must be delayed by 16 μsec and which will therefore be taken on the third line of the matrix; by a sign "—", those which must be delayed by 8 μsec and which will therefore be taken on the second line of the matrix; and by a sign "." those which must not be delayed and which will therefore be taken on the first line of the matrix.

Therefore, among the ten inputs of the adder 1, three will be connected to the outputs of the first three stages of the register 277', two will be connected to the last two stages of the register 278", one will be connected to the fourth stage of the register 275, one will be connected to the third stage from the end of the register 276", one will be connected to the fifth stage of the register 273', one will be connected to the fourth stage from the end of the register 274", one will be connected to the fifth stage from the end of the register 272".

By way of an example, for the adder No. 9 comprising two lateral inputs, the one is connected to the 16th stage of the register 275' and the other is connected to the 16th stage from the end of the register 272". The column 6 gives the distribution for each adder No. 1 to 14.

Figure 6:
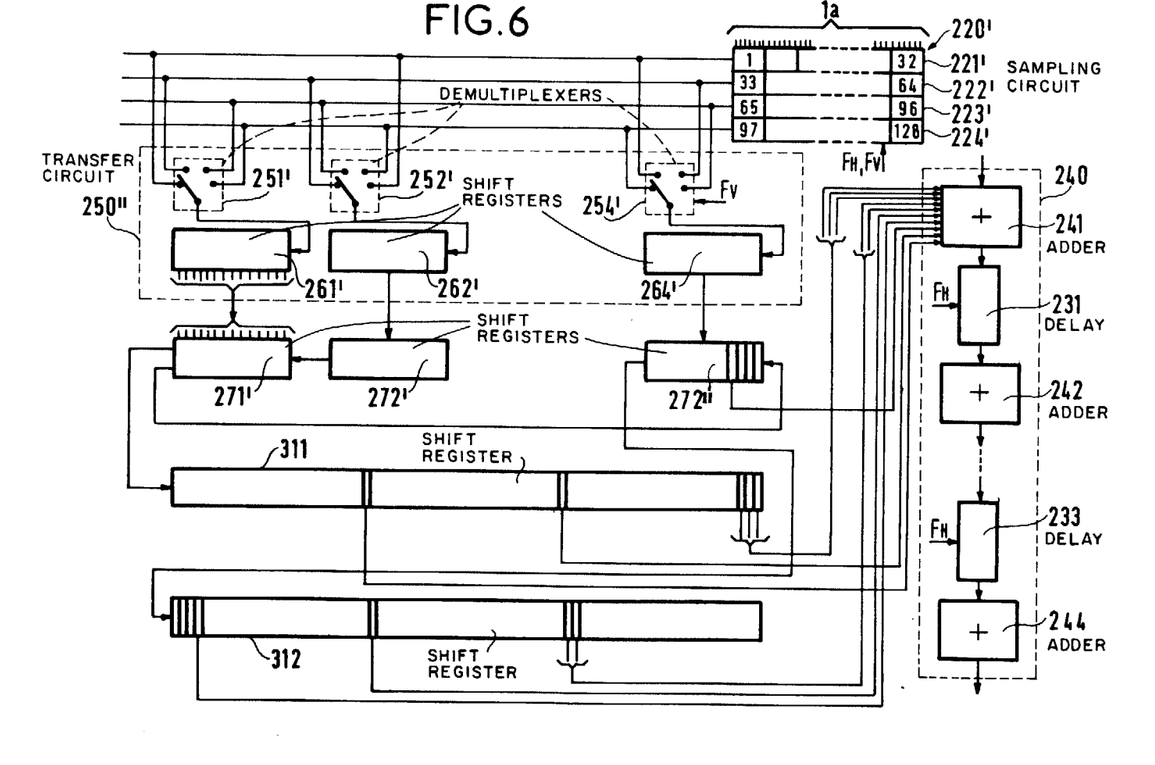
FIG. 6 shows a second variant of the device for forming channels according to the invention.

It will be observed that in the case where each delay device comprises H (or a multiple of H) stages, only the parallel outputs taken from among the first 20 of the first registers of the lines and from the last 20 of the last registers of the lines are used, this enabling the simplifying of the device for forming channels as shown in FIG. 6.

The device comprises, also, a clock, supplying the frequencies $F_H$ and $F_V = k (F_H/H)$; the frequency $F_H$ (4MHz) is used for controlling:

(1) the transfer of data from the sampling registers to the buffer registers;

(2) the circulation of data along the lines of the matrix; and (3) the circulation of the data along the delay devices.

The frequency $F_V$ (124 kHz) is used for controlling the sampling of the outputs of the peak limiters, the switching of the multiplexers, the transfer of the contents of a register of the matrix to the following register in the same column.

Thus, the signals related to the 128 channels are obtained at the output of the chain 240 with the frequency $F_e = F_V/k$ (31 kHz).

FIG. 6 shows a second variant of the device for forming channels which is a simplification of the first variant.

The second variant shown is a simplification of the case where $k = 4$. It requires, however, that the delay devices of the chain all necessarily comprise $qH$ delay cells ($q \geq 1$).

The example taken will be that of the case where $q = 1$.

As has been set forth previously, in the description of the device in FIG. 5, only the first 20 outputs of the registers of the first column of the matrix and the last 20 outputs of the last column of the matrix are used, so that the second and third columns can be dispensed with, keeping, however, the register 272', which must discharge into the register 271' and the first registers 271' and 272" of the first and fourth columns are kept, the other registers of these two columns being replaced by two registers 311 and 312 of $H \cdot (k-1)/k$ stages, i. e. in this particular case, 96 stages connected, the one to the output of the main register 271', the other being connected to the output of of the main register 271', the other being connected to the output of the main register 272".

The main register 272' has its output connected to the input of the register 271' which has its output connected to the input of the register 272" thus forming an open loop circuit.

As there is no more need for the register 271", the multiplexer 253' and the buffer register 203' can be dispensed with. The device therefore comprises sampling means 220' comprising $k$ input registers 221', 222', 223', 224' and transfer means 250" having $k/H$ stages (in the particular example, 32 stages), $h$ multiplexers 251', 252', 254', where $h < k$ (in the example, $h = 3$) having $k$ inputs and $h$ transfer registers 261', 262', 264', as well as $h$ main registers 271', 272', 272", each having K/k stages and forming an open loop circuit, $i$ charging registers 311, 312, where $i < h$ (in this example, $i = 2$), each having H $(k-l)/k$ stages (in the example, 96 stages).

To determine to which stages the inputs of the adders of the chain 240, which is identical to that of the other devices shown in FIGS. 2, 4, 5, must be connected, it must be considered that the registers of the first column of the matrix in FIG. 5 have been connected in series to provide a charging register 311 having 96 stages. The case is the same in the last column.

All the signals marked with a cross "x", and therefore those which were sampled on the first and last registers of the fourth line are sampled from among the first 32 stages of the two charging registers; thus, for the adder 1, three inputs will be connected to the first three stages of the charging register 311 and two inputs will be connected to the stages Nos. 31 and 32 of the charging register 312. The signals marked "+" are sampled from among the 32 stages of the middle of each charging register. Thus, for the adder 1, the 36th stage of the register 311 is connected to one input and the 62nd stage of the register 312 is connected to another input. The signals marked "—" are sampled from among the last 32 stages of the registers 311 and 312. Thus, for the adder 1, an input will be connected to the 69th stage of the register 311 and another input will be connected to the 93rd stage of the register 312.

The signals marked with a sign "." will be sampled as in the device in FIG. 5 on the main registers 271' and 272". Thus, for the adder 1, one input is connected to the fifth stage from the end of the register 272".

The clock 200 also supplies the frequencies $F_V$ and $F_H$.

The frequency $F_H$ is used for controlling the loading of the input registers into the buffer registers, the circulation of data in the open loop constituted by the main registers, the discharging of the main registers in the charging registers, and the circulation of data in the delay devices of the chain 240.

The frequency $F_V$ is used for controlling the sampling by the input registers of the signals coming from the peak detectors, the switching of the multiplexers and the transfer of the data contained in the buffer registers to the main registers.

To simplify further the device in FIG. 6, in the case where N is not greater than H/k, i. e. in this particular case not greater than 32, the 32 stages to be connected to the adders can be grouped together in a single main register; in this case, nine adders separated by delay devices delaying by 32 μ sec must be taken.

The number of the peak limiters is shifted behind 16, this being possible by connecting the outputs of the peak limiters 112 to 128 and 1 to 16 to the first input register and so on for the other input registers.

It is thus possible to dispense with the main register 272" and its charging register 312, as well as with the multiplexer 254 and the buffer register 264'. In the case where $k = 4$, $h = 2$ and $i = 1$ can be obtained.

Although the devices for forming channels which have just been described appear to afford the greatest advantages, for implementing the invention, it will be understood that various modifications can be made thereto without going beyond the scope of the invention, it being possible to replace some of these elements by others which are capable of fulfilling the same technical function or an equivalent technical function therein.

What is claimed is:

1. In a device for forming channels comprising H detectors regularly spaced out on a circular base, H peak limiters, each peak limiter being connected to the output of a detector, a chain constituted by an alternate sequence of adders and of delay devices, each delay device comprising several elementary delay cells of delay $\tau$ ($\tau = 1/F_H$, $F_H$ being a clock frequency applied to the delay devices) and being connected at their output to an input of an adder of the chain, the improvement comprising:

a shift register forming a looped circuit and comprising H stages, the parallel inputs of the said stages being connected to the outputs of the H peak limiters and the parallel outputs of the said stages being connected to inputs of the said adders of the chain; and a clock supplying a frequency $F_V = F_H/H$ by means of which the output signals of the H peak limiters are sampled by the said register and a frequency $F_H$ by means of which the data advances along the stages of the said register and along the delay devices.

2. A device for forming channels according to claim 1, wherein the delay devices of the chain have an identical delay which is equal to or a multiple of H $\tau$.

3. In a device for forming channels comprising H detectors regularly spaced out on a circular base; H peak limiters, each peak limiter being connected to the output of a detector; and a chain constituted by an alternate sequence of adders having several inputs and of delay devices, each delay device comprising several elementary delay cells $\tau(\tau = 1/F_H$, ($F_H$ being a clock frequency applied to the delay devices) and being connected at their output to an input of an adder of the chain; the improvement comprising:

means for sampling at a frequency $F_V$ signals coming from the H peak limiters, where $F_V = F_H/H(k)$, $k$ being a sub-multiple of H;

a square matrix of $k \times k$ shift registers, each of these registers comprising H/k stages, the $k$ registers of each line of the matrix being connected in series and the series output of the first being connected to the input of the last register to form a closed loop circuit, the H/k parallel outputs of each register of a column of the matrix being connected to the H/k parallel inputs of the following register of the said column, some parallel outputs of the $k \times k$ registers of the matrix being applied to the inputs of the adders of the chain;

means for transferring the data coming from the sampling means towards the first line of the square matrix which shift by H/k (modulo H) the numbers of the peak limiters transferred once every $1/F_V$; and a clock supplying a frequency $F_H$ used for controlling the movement of the data in the lines of the matrix and in the delay devices and a frequency $F_V$ used for controlling the sampling means and the transfer means as well as the advance of the data along the columns of the matrix.

4. A device for forming channels according to claim 3, wherein the delay devices of the chain have an identical delay which is equal to or a multiple of $H_\tau$.

5. A device for forming channels according to claim 3, wherein the sampling means are constituted by $k$ input shift registers, each comprising H/k stages, each of the H peak limiters being connected to the parallel input of a stage of one of the input registers and wherein the transfer means comprises $k$ multiplexers having $k$ inputs and one output, the $k$ inputs of the multiplexers being connected to the series outputs of the $k$ input registers as well as $k$ transfer shift registers, each comprising H/$k$ stages, the input of each transfer register being connected to the output of a multiplexer and the parallel outputs of a transfer register being connected to the parallel inputs of a register of the first line of the matrix.

6. In a device for forming channels comprising H detectors regularly spaced out on a circular base; H peak limiters, each peak limiter being connected to the output of a detector; and a chain constituted by an alternate sequence of adders and of delay devices, each delay device comprising several elementary cells $\tau(\tau=1/F_H$, $F_H$ being a clock frequency applied to the delay devices) and being connected at their output to an input of an adder of the chain, the improvement comprising:

means for sampling at a frequency $F_V=$ʳH/H(K) ($k$ being a sub-multiple of H greater than unity), signals coming from the H peak limiters;

$h$ main shift registers ($h < k$) forming an open loop circuit, each of these registers comprising H/$k$ states;

means for transferring the data coming from the sampling means towards the main registers which shift by H/$k$(modulo H), the numbers of the peak limiters transferred once every 1/$F_V$;

$i$ charging shift registers whose input is connected to the output of $i$ registers taken from among the $k$ main registers ($i<h$), each of the said charging registers comprising H·($k-l$)/$k$ stages; and a clock supplying a frequency $F_H$ used for controlling the shifting of the data along the open loop cntstitued by the $h$ main registers and along the charging registers as well as in the delay devices and a frequency $F_V$ used for controlling the sampling means and the transfer means, some parallel outputs of the $i$ charging registers and of the main registers to which they are connected being connected to inputs of the adders of the chain and in that the delay devices comprise the same number qH of elementary cells where $q \geq 1$.

7. A device for forming channels according to claim 6, wherein the sampling means are constituted by $k$ input shift registers each comprising H/$k$ stages, each of the H peak limiters being connected to the parallel input of a stage of one of the input registers and wherein the transfer means comprises $h$ multiplexers having $k$ inputs and one output, the $k$ inputs of the multiplexers being connected to the series outputs of the $k$ input registers as well as $h$ transfer shift registers each comprising H/$k$ stages, the input of each transfer register being connected to the output of a multiplexer and the parallel outputs of a transfer register being connected to the parallel inputs of one of the main registers.

8. A device for determining the direction of propagation of signals detected by an array of H signal detectors regularly spaced on a circular base line by accumulating signals derived from an incident wave travelling in a predetermined direction past the array of signal detectors and by scanning through a plurality of predetermined directions, the device comprising:

a plurality of device input terminals for receiving signals from the H detectors, a source of sampling signals having a frequency $F_V$, shift register means having parallel inputs connected to the device inputs and controlled by the sampling signals to parallel load signal samples at sampling instants once every sampling period, a chain comprising an alternating sequence of adders and delay devices in which each delay device has a series input connected to the output of the preceding adder and a series output connected to one of the inputs of the succeeding adder and in which the output of the last adder of the chain provides an output signal for the device as a whole, each adder having a set of inputs connected to a pattern of parallel outputs of said shift register means, said pattern correspondng to the pattern of signal detectors which detect the same incident wave during one sampling period provided said incident wave is travelling along said predetermined direction, each of said delay devices having a delay period chosen to so delay the output of its input adder that the sun derived by said input adder during one sampling period from said incident signal and any possible previous sum is added by the output adder of said delay device with the signals derived from said incident signal during a subsequent sampling period, whereby signals derived from said incident wave during a plurality of sampling periods are accumulated by said chain, and a source of scanning signals having a frequency $F_H$, where $F_H$ is higher than $F_V$, connected to said shift register means to cause the signal samples stored therein to shift past said parallel outputs to said adders whereby a plurality of different directions are scanned by said device by effectively rotating the connections between the shift register means and the device input terminals.

9. A device according to claim 8, wherein the shift register means is adapted to receive digital input signal samples from the detectors.

10. A device according to claim 8, wherein the delay period of each delay device is equal to an integral multiple of the sampling period.

11. A device according to claim 8, wherein the delay periods of the delay devices are the same.

12. A device according to claim 8, wherein the shift register means includes storage for samples from a plurality of successive sampling periods, whereby at least some of the adders have inputs connected to receive simultaneously samples from different ones of said successive sampling periods.

* * * * *